(12) United States Patent
Glendining et al.

(10) Patent No.: US 7,133,372 B2
(45) Date of Patent: Nov. 7, 2006

(54) REDUCING POWER CONSUMPTION IN PACKET BASED NETWORKS WITH QUALITY OF SERVICE (QOS) FEATURES

(75) Inventors: Duncan Glendining, Chandler, AZ (US); Bhaktha R. Keshavachar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1061 days.

(21) Appl. No.: 09/895,564

(22) Filed: Jun. 29, 2001

(65) Prior Publication Data

US 2003/0002465 A1 Jan. 2, 2003

(51) Int. Cl.
 *G08C 17/00* (2006.01)
(52) U.S. Cl. ................. 370/311; 455/574
(58) Field of Classification Search ......... 370/310, 370/311, 333, 338, 349, 352–356, 317, 318, 370/395.21; 455/522, 574
See application file for complete search history.

(56) References Cited

U.S. PATENT DOCUMENTS

| | | | | |
|---|---|---|---|---|
| 5,117,420 A | * | 5/1992 | Hillis et al. ............ | 370/400 |
| 5,577,044 A | * | 11/1996 | Oxford .................. | 370/522 |
| 5,875,155 A | | 1/1999 | Hill et al. | |
| 5,903,554 A | | 5/1999 | Saints | |
| 6,016,317 A | * | 1/2000 | Sakurai et al. ......... | 370/391 |
| 6,061,365 A | | 5/2000 | Yeung et al. | |
| 6,078,818 A | | 6/2000 | Kingdon et al. | |
| 6,208,861 B1 | | 3/2001 | Suzuki | |
| 6,275,502 B1 | * | 8/2001 | Arimilli .................. | 370/468 |
| 6,501,741 B1 | | 12/2002 | Mikkonen et al. | |
| 6,553,231 B1 | | 4/2003 | Karlsson et al. | |
| 6,618,397 B1 | | 9/2003 | Huang | |
| 6,621,805 B1 | | 9/2003 | Kondylis et al. | |
| 6,704,315 B1 | * | 3/2004 | Besset-Bathias ....... | 370/395.4 |
| 6,721,334 B1 | | 4/2004 | Ketcham | |
| 6,721,567 B1 | | 4/2004 | Wang et al. | |
| 6,868,080 B1 | * | 3/2005 | Umansky et al. ....... | 370/354 |
| 6,876,867 B1 | | 4/2005 | Tiedemann, Jr. et al. | |
| 6,882,624 B1 | | 4/2005 | Ma | |
| 2002/0071397 A1 | | 6/2002 | Keshavachar | |
| 2002/0089947 A1 | | 7/2002 | Holtzman et al. | |
| 2002/0093976 A1 | | 7/2002 | Razoumov et al. | |

FOREIGN PATENT DOCUMENTS

WO PCT/US02/19647 4/2003

\* cited by examiner

*Primary Examiner*—Ajit Patel
(74) *Attorney, Agent, or Firm*—Blakely, Sokoloff, Taylor & Zafman LLP

(57) ABSTRACT

A method includes combining at least two separate user information packets into a transmission packet by an information-processing unit, wherein the information-processing unit saves power by eliminating at least one power up cycle and one power down cycle by transmitting the transmission packet.

59 Claims, 5 Drawing Sheets

REDUCING POWER CONSUMPTION IN PACKET BASED NETWORKS WITH QUALITY OF SERVICE (QOS) FEATURES

RELATED APPLICATIONS

This patent application is related to a previously filed patent application, patent application Ser. No. 09/733,545, filed on Dec. 7, 2000, entitled "Portable Communications Device and Method Therefor", by Bhaktha R. Keshavachar.

FIELD OF THE INVENTION

The invention relates generally to packet information transmission, and more specifically to maintaining end-to-end Quality of Service (QoS) parameters while time delaying information packets and saving power thereby.

BACKGROUND

A capacity of a wireless communications network (e.g. a number of communication devices that may be supported by the network) is generally determined by an acceptable bit error rate (BER), an acceptable signal-to-noise ratio of the communications devices operating within the network, and the type of service (data rate) required by the communication devices. These parameters are often affected by such factors as the amount of noise and interference within the network, multi-paths, distance between the communication device and a transmitting base station, and the transmission power of the communications device.

One technique to increase the number of communication devices that may operate within the network is to allow the individual communications devices to determine the acceptable communications parameters, such as a desired quality of service (QoS), required for a particular transmission of information. For example, the communications device may request a connection to a base station that permits an information transfer rate of 100 kilo bits/second and a maximum time delay of 10 milliseconds in between information packets.

Different kinds of information are transferred through the communications network. Users are aware to varying degrees of a "delay" associated with the transmission of information, as the information, traverses from a first point to a second point within the communications network. Thus, a variety of levels of QoS are provided within the communications network.

Conversational class known in the art as telephony speech is performed between peers of live users. This class of information transfer is subject to human perception because of the real time characteristic inherent in a conversation between human users. Thus, the transfer delay needs to be low because of the conversational nature of this scheme. The limit for acceptable delay is given by the human perception of video and audio conversation. Failure to provide a low enough delay will result in an unacceptable lack of quality. Thus conversational class transmissions have the most stringent requirements for QoS time delay.

Streaming class refers to the transmission of information that occurs when a user is looking at or listening to a real time video or audio broadcast. This is a one way transport of information. It is important that the time alignment between entities (i.e. samples, packets) in the broadcast stream be preserved, however, the streaming class transmission does not have a QoS requirement for a low time delay as does the conversational class.

Interactive class describes the situation that occurs when a user, either machine or human, is requesting information from equipment at a remote site. Some examples of human interaction with the equipment at the remote site are: web browsing, data base retrieval, and server access. Round trip delay time is a key attribute of this type of information transfer. Interactive class information transfer is characterized by the request response pattern of the user, thus the QoS delay requirement is important, approaching the kind of delays users find acceptable with conversational class information transfer.

Background class information transfer occurs when information is sent or received in the background, typically by a computer. Examples of this type of information transfer are E-mails, downloads of data bases, etc. Background transfer of information is characterized by the fact that the destination is not expecting the information within a certain time. Background class information transfer is, in general, time insensitive. However, when multiple classes of information transfer are initiated by a user, such as conversational class and background class (E-mail), it is possible for a large delay in background class information transfer to be perceived as annoying by the user.

In many cases the communication devices are mobile and are powered by a battery. The battery will operate for a finite time before needing to be recharged. What is needed therefore, is a way of extending battery life by reducing the power required to transmit information from the communication device within the constraints imposed by QoS requirements on the transfer of information.

DETAILED DESCRIPTION

Figure 1:
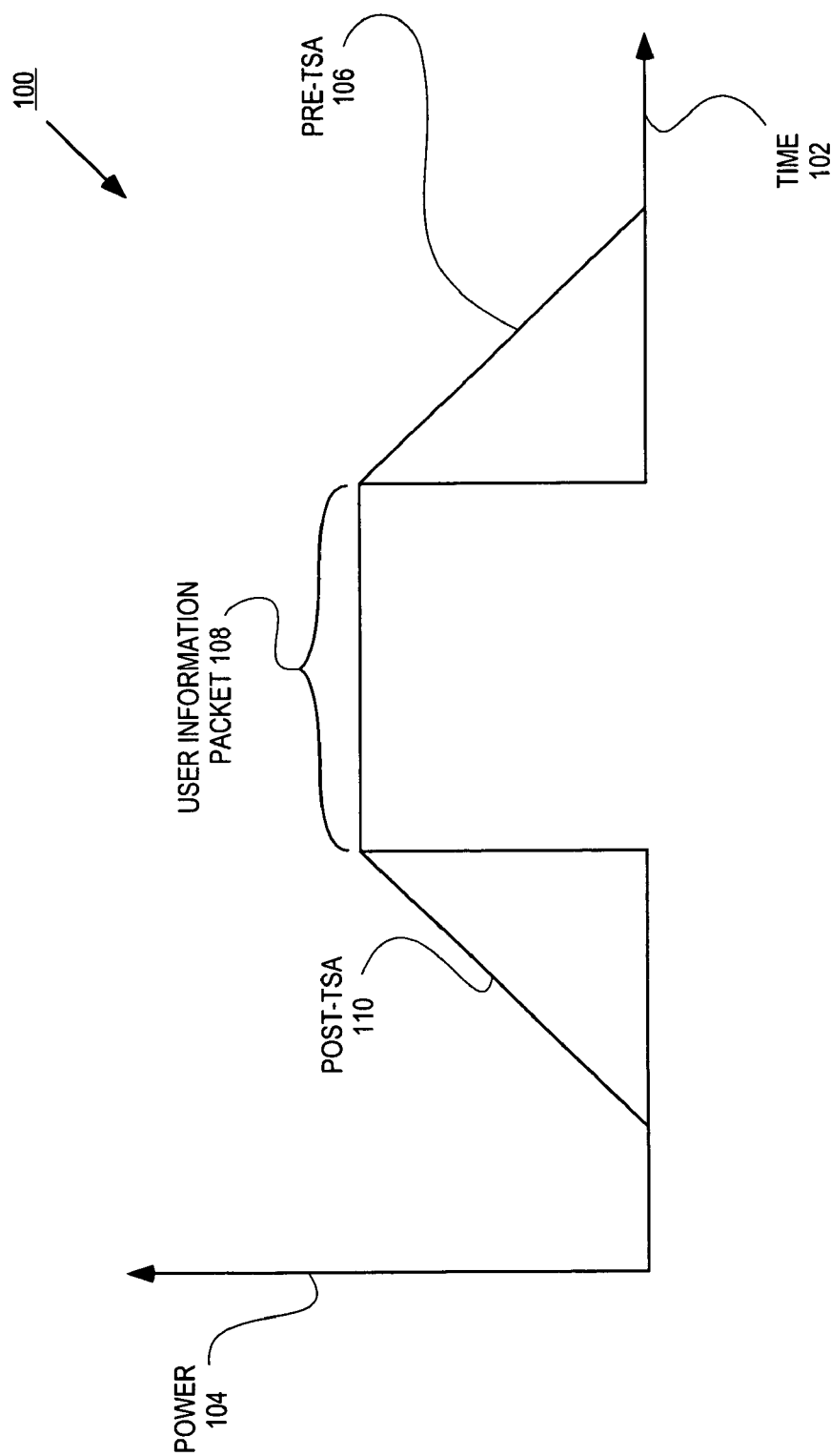
FIG. 1 displays a power verses time relationship for a user information packet.

In the following detailed description of embodiments of the invention, reference is made to the accompanying drawings in which like references indicate similar elements, and in which is shown by way of illustration, specific embodiments in which the invention may be practiced. These embodiments are described in sufficient detail to enable those of skill in the art to practice the invention. The following detailed description is, therefore not to be taken in a limiting sense, and the scope of the invention is defined only by the appended claims.

Portions of the detailed description, which follows, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is herein, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient to refer to these signals as bits values, elements, symbol, characters, terms, numbers, or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the detailed description discussions utilizing terms such as "processing," "computing," "calculating," "determining," or the like, refer to the action and/or processes of a computer or computing system, or similar electronic computing device. Such a device manipulates and/or transforms data represented as physical, such as electronic quantities within the computing system's registers and/or memories into other data similarly represented as physical quantities within the computing system's memories, registers or other such information storage, transmission or display devices.

Embodiments of the invention may include apparatuses for performing the operations herein. These apparatuses may be specially constructed for the desired purposes, or they may comprise a general purpose-computing device selectively activated or reconfigured by a program stored in the device. Such a program may be stored on a storage medium, such as, but is not limited to, any type of disk including floppy disks, optical disk, CD-ROMs, magnetic-optical disks, read-only memories (ROMs), random access memories (RAMs), electrically programmable read only memories (EEPROMs), magnetic or optical cards, or any other type of media suitable for storing electronic instructions, and capable of being coupled to a system bus for a computing device.

In addition, embodiments of the invention are not described with reference to any particular programming language. It will be appreciated that a variety of programming languages may be used to implement the teachings of the invention as described herein.

In one embodiment, the invention decreases power usage during transmission of information packets by combining at least two user information packets into a transmission packet. Thereby saving power relative to an amount of power that would be required to transmit each information packet individually.

One embodiment finds general applicability to systems utilizing circuit switched voice (both analogue and digital voice), and packet switched data transmission. The systems intended to be within the scope of the invention include, but are not limited to: Code Division Multiple Access (CDMA) cellular radiotelephone communications systems; Global System for Mobile Communications (GSM) cellular radiotelephone systems; North American Digital Cellular (NADC) cellular radiotelephone systems; Time Division Multiple Access (TDMA) systems; Extended-TDMA (E-TDMA) cellular radiotelephone systems, third generation (3G) systems such as Wide-band CDMA (WCDMA); CDMA (2000); and the like. Others may incorporate one embodiment without departing from the invention.

In one embodiment, the invention may be applied to the systems mentioned above which envisage connectionless packet based information transmission with different QoS requirements. The different QoS requirements arise from the different types of information that may be transferred through the information system. In one embodiment, an information-processing unit may be a communications device, such as a cellular telephone or a personal data assistant (PDA). For example, a cellular telephone communication between two users would require a different QoS maximum time delay than an email being sent as packet data from the PDA. The QoS requirement for the cellular telephone communication may require that the time delay not exceed 80 milliseconds, whereas the QoS time delay requirement for the E-mail may be measured in seconds, minutes, or even hours.

FIG. 1 displays a power verses time characteristic 100 common to a user information packet. With reference to FIG. 1, a vertical axis displays power 104 and a horizontal axis displays time 102. A user information packet 108 contains the information that is useful and required by a user for transmission. The user information packet 108 may represent speech resulting from a cellular telephone conversation, or it may represent data from the E-mail message. A pre-transmission system activity PRE-TSA 106 is used to denote expenditure of power during system overhead functions which may include; processor wakeup, preparation of data, negotiation of QoS requirements, including bandwidth allocation from the network, and authentication, etc. In one embodiment, during the time required for PRE-TSA 106, power is being expended while no user information is being transferred. Once the bandwidth has been allocated and a channel has been secured, the user information packet 108 is transmitted. Following the transmission of the user information, a POST-TSA 110 phase expends power while bandwidth is de-allocated and the transmitter and associated system components are powered down. Similar to the PRE-TSA 108 phase, during the POST-TSA 110 phase no user information is being transmitted. These PRE-TSA 108 and POST-TSA 110 phases represent a form of transmission overhead with respect to information transmission and waste battery power. It is desirable to minimize the PRE-TSA 108 and POST-TSA 110 phases during transmission of multiple user information packets in order to save battery power. In one embodiment, saving battery power extends the time between battery charging cycles for a rechargeable battery. In another embodiment, saving battery power extends the life of a non-rechargeable battery.

Combining Input Signals

Figure 2:
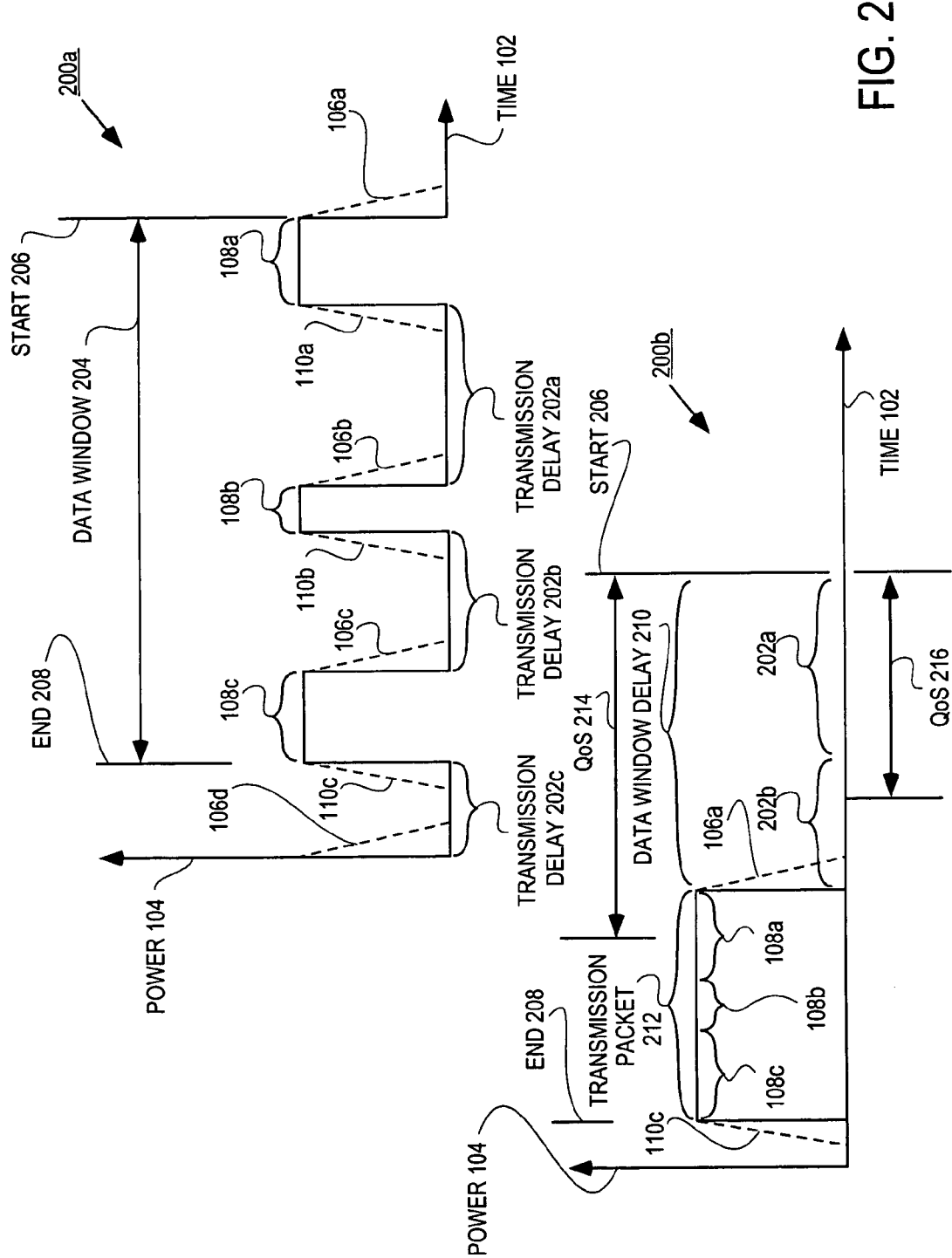
FIG. 2 shows a relationship resulting when a plurality of user information packets is combined into a transmission packet.

In one embodiment, the invention may be applied to an input signal 200a, as shown in FIG. 2. With reference to FIG. 2, a data window 204 contains three user information packets 108a, 108b, and 108c. The user information packet 108a has a pre-transmission system activity 106a associated with it and a post transmission system activity 110a. Similarly, the user information packet 108b has a pre-system activity 106b associated with it and a post transmission system activity 110b, and the user information packet 108c has a pre-transmission activity 106c associated with it and a post transmission system activity 110c. A transmission delay 202a separates the user information packet 108b from the user information packet 108a and a transmission delay 202b separated the user information packet 108c from the user information packet 108b.

The invention delays transmission of the user information packets within a QoS 214 requirement as shown in an output signal 200b. The output signal 200b contains all three user information packets, 108a, 108b, and 108c, however the user information packets have been combined into a transmission packet 212. The transmission packet 212 requires only the single pre-transmission activity 106a and the single post transmission activity 110c, thereby saving the power that would have been required by transmitting the user information packets individually. Individual transmission of the user information packets incurs the overhead power expenditures of associated with 110a, 106b, 110b, and 106c. In this example, only the transmission packet 212 is actually transmitted by a transmitter as shown in the output signal 200b.

The data window 204 has allowed the transmission delays 202a and 202b to sum together forming a data window delay 210. In order to stay within a QoS time delay requirement, the data window delay 210 must not substantially exceed the QoS 214 time delay. The data window 204 may be flexibly chosen and is related to the particular QoS requirements corresponding to the information being transferred. The data window has a start 206 and an end 208. The data window 204 could have been chosen to be smaller if the maximum time delay (determined from the QoS requirements), allocated to processing the signal, was smaller than that shown by the QoS 214 time delay. For example, the data window 204, has resulted in the data window delay 210 which does not substantially exceed the QoS 214 time delay. Thus, QoS requirements are not violated. In this example, the data window delay 210 is actually less than the QoS 214 time delay. However, the QoS requirements could have resulted in a QoS 216 time delay. In this case, the data window delay 210 is larger than the QoS 216 time delay. Whether the data window delay 210 is substantially greater than the QoS 216 time delay is a matter of a particular design of service to which the QoS pertains. Therefore, in some designs of service, the data window delay 210 is not substantially greater than the QoS time delay 216.

The transmission packet 212 is shown approximately equivalent, in duration, to the user information packets, however, the information-processing unit may perform additional processing on the user information packets. This additional processing may consist of encryption, compression, encoding, and/or interleaving the user information packet with other information that the information-processing unit may be transferring. Thus, the transmission packet 212 may be smaller than or larger than the combination of the user information packets within the data window 204. It is anticipated that additional power may be saved by compressing the user information packets and/or the transmission packet, thus, requiring less time for transmitting data in the data window and saving power thereby.

Figure 3:
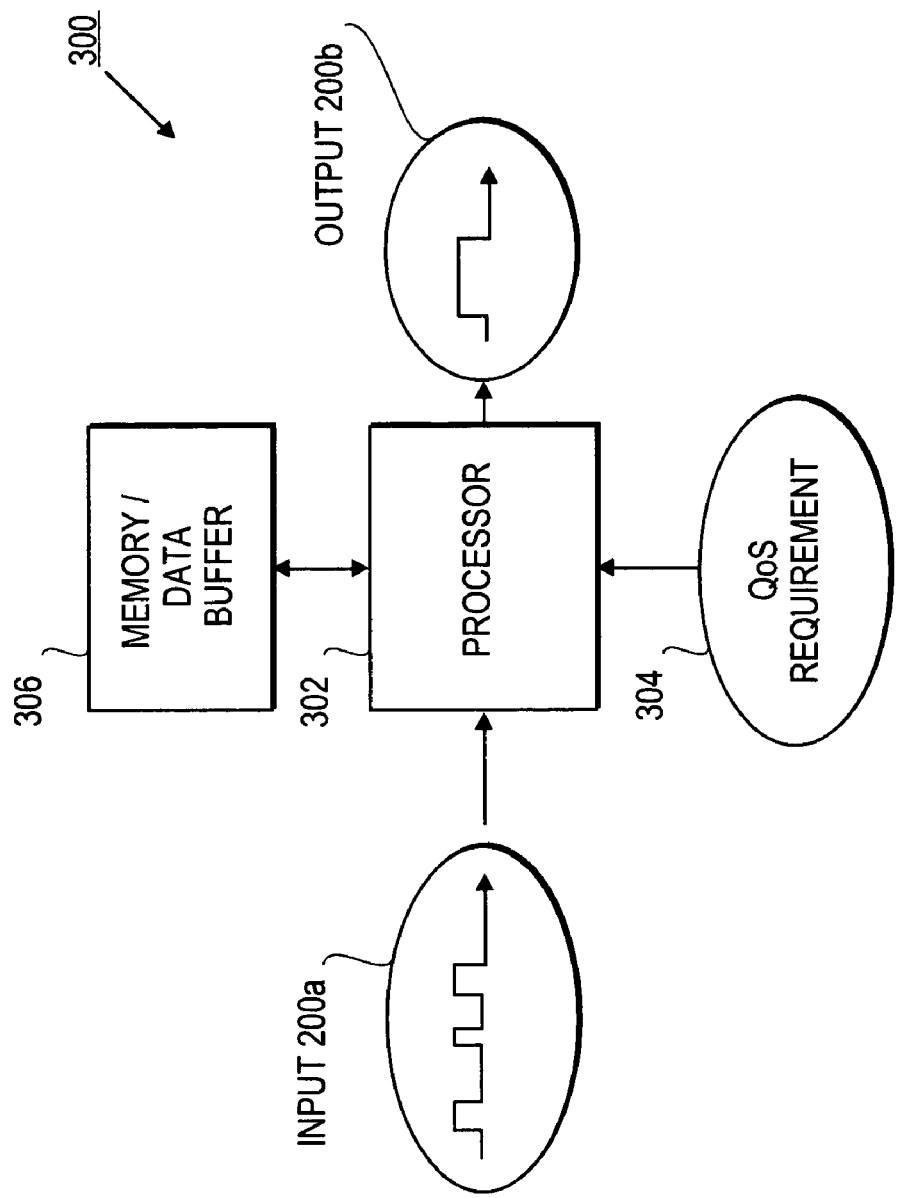
FIG. 3 is a block diagram of an arrangement of hardware that forms a transmission packet.

It is anticipated that many configurations of hardware may be used by those skilled in the art to practice the invention. In one embodiment, of the invention, FIG. 3 is a block diagram of an arrangement of hardware that forms the transmission packet. With reference to FIG. 3, the input signal 200a is processed by processor 302 to produce the output signal 200b. The processor 302 processes the input signal 200a according to the QoS requirement 304. A memory/data buffer 306 may be used to store the user information packets 108a, 108b, 108c, and the transmission packet 212 (FIG. 2) during the processing of the input signal 200a and outputting of the output signal 200b.

System QoS Budget

Figure 4:
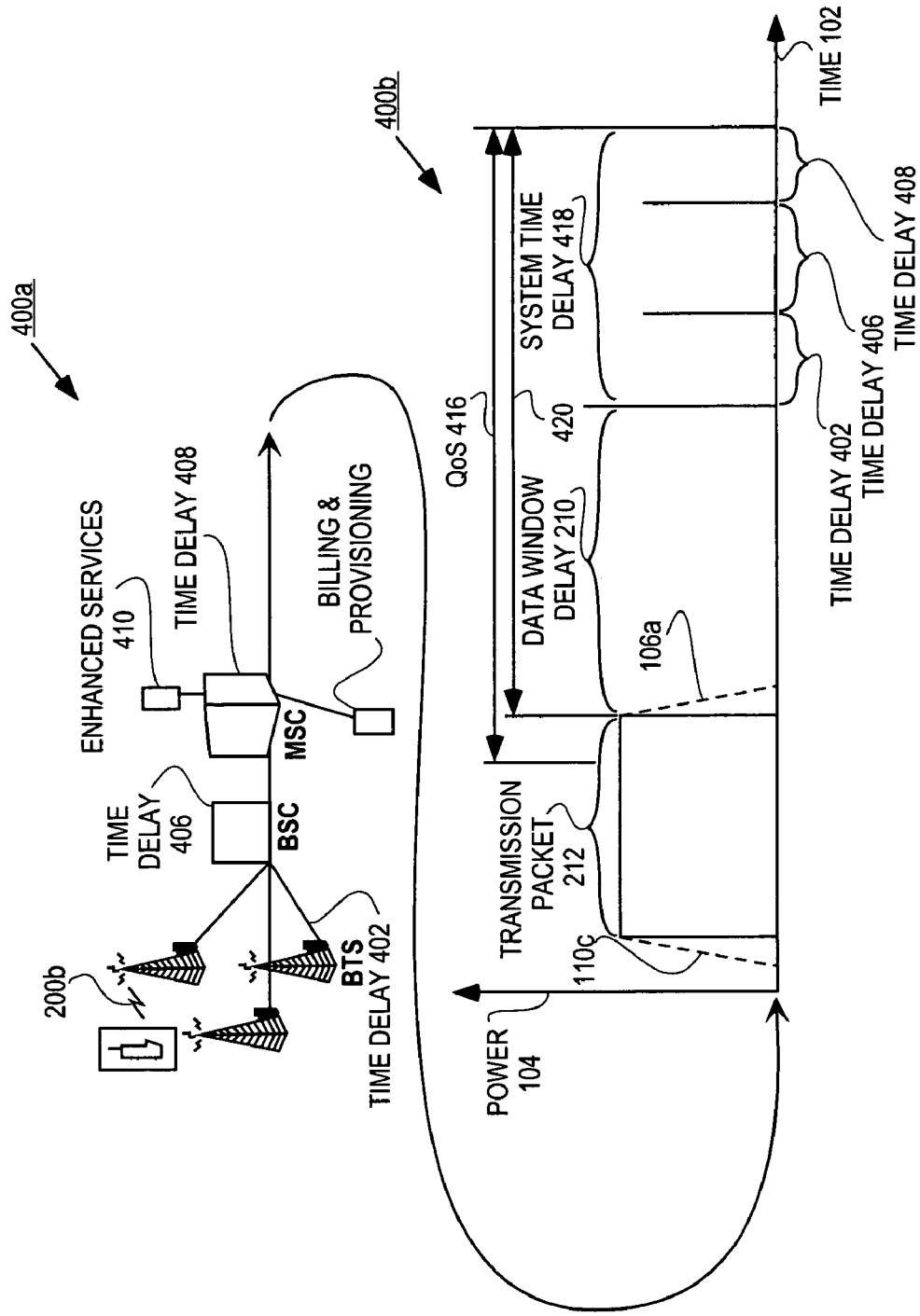
FIG. 4 shows a time delay introduced by one end of a communications system.

The information-processing unit may be constrained by the system in which it is operating. For example, a particular system QoS requirement may result in a reduced time delay available to the information-processing unit due to time delays introduced by other parts of the system. With reference to FIG. 4, a first end of an information transmission system is shown as 400a. The output signal 200b (transmitted from the information-processing unit) is received by a Base Transceiver (BTS) where a time delay 402 may be introduced. Additional time delay may be introduced by a Base Station Controller (BSC), introducing a time delay 406. A Mobile Switching Center (MSC) may introduce a time delay 408. In one embodiment where the information-processing unit is a cellular telephone, the first end of the information transmission system may have enhanced services 410 and a billing & provisioning 412 unit attached, these system components may or may not introduce additional time delay. The exact system design is not important and does not limit the invention. The combined time delay present in the first end of the information transmission system results in a system time delay 418.

A system QoS requirement may result in a QoS 416 time delay. The QoS 416 time delay is larger than a total delay 420. The total delay 420 is the sum of the data window delay 210, and the system time delay 418. In this example, of one embodiment of the invention, the total delay 420 is not substantially greater than the QoS 416 time delay, thus the QoS requirement for this example is maintained. In this example, the total delay 420 is actually less than the QoS 416 time delay.

Figure 5:
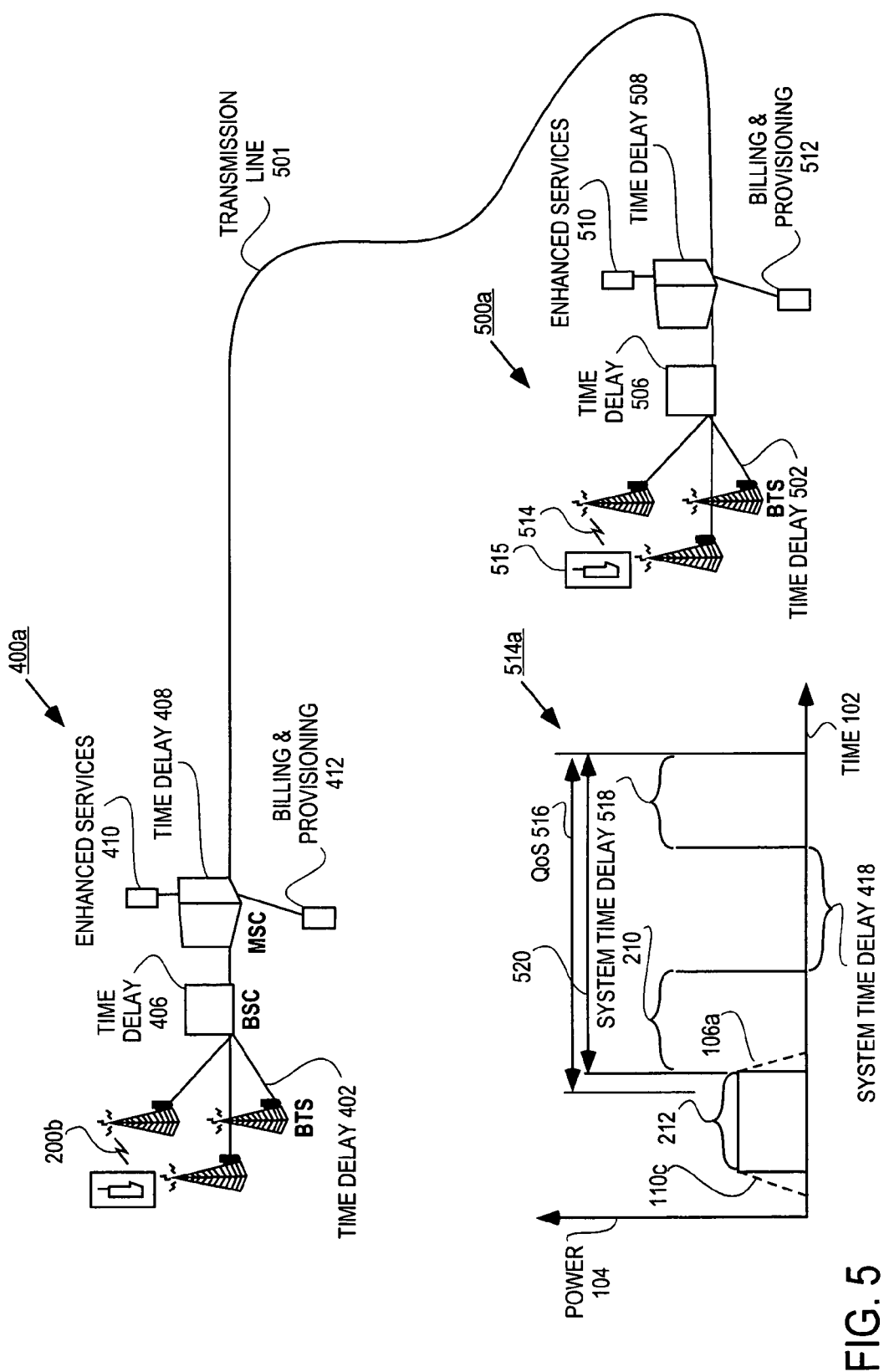
FIG. 5 displays an end-to-end QoS requirement on a transmission packet.

Typically, information is transferred between two points. When applied to communication systems, this concept may be referred to as end-to-end. The concept of maintaining the QoS requirement may be extended from the first end of the information transmission system to the second end of the information transmission system. FIG. 5 displays the end-to-end QoS requirement on the transmission packet 212. A second end of an information transmission system is shown as 500a, which is connected to the first end of the information transmission system 400a, by a suitable transmission line 501. The transmission line 501 may be any transmission line well known in the art such as an optical fiber, a coaxial cable, a twisted pair, or a propagation of electromagnetic energy via wireless transmission. The second end of the information transmission system is shown containing an array of components similar to the first end, for convenience, no constraint on the invention is implied. The second end of the information transmission system contains a MSC, which may introduce a time delay 508, a BSC which may introduce a time delay 506, and a BTS which may introduce a time delay 502. An end-to-end output signal 514 is broadcast to a second information-processing unit 515. A power verses time characteristic of the end-to-end output signal 514, is displayed as 514a. An end-to-end QoS time delay 516 is shown in 514a. A total end-to-end time delay 520 is the sum of the time delay associated with the first end of the information transmission system 418, a time delay associated with the second end of the information transmission system 518, and the data window delay 210. The total end-to-end time delay 520 is not substantially greater than the QoS 516 time delay, thereby maintaining the end-to-end system QoS requirement. In this example, the total end-to-end time delay 520 is less than the QoS 516 time delay. In practice, this relationship may exceed the actual requirements for a given level of QoS. Acceptable performance may be achieved as long as the total end-to-end time delay 520 is not substantially greater than the QoS time delay that pertains to the particular class of service.

The invention may be employed in flexible way within the information transmission system. In one embodiment, the information-processing unit begins a session in which information is transferred to and from the information transmission system, for example, an Internet access session. At the start of the session, a particular QoS and associated time delay is employed for the transfer of information as previously described. During the session, the QoS can be dynamically changed and reassigned as needed, thereby changing the QoS parameters associated with the transfer of information. In this embodiment, the QoS time delay may either increase or decreased as the QoS is changed during the session. Alternatively, the time delay may be changed within a session, while other QoS parameters remain fixed. In another embodiment, the same QoS is maintained throughout the session. Many embodiments of the invention are anticipated when the invention is implemented within the context of the information transmission system.

Thus, a novel apparatus and method are disclosed which allows the information-processing unit to save power while maintaining QoS requirements both individually, at a system level, and in an end-to-end system perspective, as well as from other perspectives not discussed. Although the invention is described herein with reference to specific embodiments, many modifications therein will readily occur to those of ordinary skill in the art. Accordingly, all such variations and modifications are included within the intended scope of the invention as defined by the following claims.

What is claimed:

1. A method comprising:
   combining at least two separate user information packets into a transmission packet by an information-processing unit; and
   eliminating at least one power up cycle and one power down cycle by transmitting the transmission packet.

2. The method of claim 1, wherein a total elapsed time between the at least two separate user information packets is greater than a portion of a system quality of service (QoS) parameter allocated to the information-processing unit.

3. The method of claim 1, wherein a total elapsed time between the at least two separate user information packets is less than a portion of a system quality of service (QoS) parameter allocated to the information-processing unit.

4. The method of claim 1, wherein a total elapsed time between the at least two separate user information packets is equal to a portion of a system quality of service (QoS) parameter allocated to the information-processing unit.

5. The method of claim 1, wherein an end-to-end quality of service (QoS) requirement is maintained during said combining.

6. The method of claim 1, wherein information contained in the user information packets are at least one of packet voice and packet data.

7. An apparatus comprising:
   an information-processing unit to combine at least two separate user information packets into a transmission packet;
   wherein at least one power up cycle and one power down cycle is eliminated "by transmitting the transmission packet".

8. The apparatus of claim 7, wherein information contained in the user information packets are at least one of packet voice and packet data.

9. A method comprising:
   grouping at least two separate user information packets;
   combining the least two separate user information packets into a single transmission packet by an information-processing unit; and
   eliminating at least one power up cycle and one power down cycle by transmitting the transmission packet.

10. The method of claim 9, wherein a total elapsed time between the at least two separate user information packets is greater than a portion of a system quality of service parameter (QoS) allocated to the information-processing unit.

11. The method of claim 9, wherein a total elapsed time between the at least two separate user information packets is less than a portion of a system quality of service parameter (QoS) allocated to the information-processing unit.

12. The method of claim 9, wherein a total elapsed time between the at least two separate user information packets is equal to a portion of a system quality of service parameter (QoS) allocated to the information-processing unit.

13. The method of claim 9, wherein information contained in the user information packets are at least one of packet voice and packet data.

14. The method of claim 9, wherein an end-to-end quality of service (QoS) requirement is maintained.

15. The method of claim 9, wherein a portion of a system quality of service parameter (QoS) allocated to the information-processing unit is dynamically changed.

16. An apparatus comprising:
   an information-processing unit to combine at least two separate user information packets into a single transmission packet and to eliminate at least one power up cycle and one power down cycle by transmitting the single transmission packet.

17. The apparatus of claim 16, wherein a total elapsed time between the at least two separate user information packets is greater than a portion of a system quality of service parameter (QoS) allocated to the information-processing unit.

18. The apparatus of claim 16, wherein a total elapsed time between the at least two separate user information packets is less than a portion of a system quality of service parameter (QoS) allocated to the information-processing unit.

19. The apparatus of claim 16, wherein a total elapsed time between the at least two separate user information packets is equal to a portion of a system quality of service parameter (QoS) allocated to the information-processing unit.

20. The apparatus of claim 16, wherein an end-to-end quality of service (QoS) requirement is maintained.

21. The apparatus of claim 16, wherein information contained in the user information packets are at least one of packet voice and packet data.

22. A computer readable medium containing executable program instructions, which when executed by a data processing system, cause the data processing system to perform the steps comprising:
   combining at least two separate user information packets into a single transmission packet by an information-processing unit; and
   eliminating at least one power up cycle and one power down cycle by transmitting the transmission packet.

23. The computer readable medium of claim 22, wherein a total elapsed time between the at least two separate user information packets is greater than a portion of a system quality of service parameter (QoS) allocated to the information-processing unit.

24. The computer readable media of claim 22, wherein a total elapsed time between the at least two separate user information packets is less than a portion of a system quality of service parameter (QoS) allocated to the information-processing unit.

25. The computer readable media of claim 22, wherein a total elapsed time between the at least two separate user information packets is equal to a portion of a system quality of service parameter (QoS) allocated to the information-processing unit.

26. The computer readable media of claim 22, wherein an end-to-end quality of service (QoS) requirement is maintained.

27. A method comprising:
inputting a single transmission packet of user information comprising a combination of at least two separate user information packets into an information transmission system;
conveying the transmission packet through the information transmission system; and
eliminating at least one power up cycle and one power down cycle by conveying the transmission packet.

28. The method of claim 27, wherein a total elapsed time between the at least two separate user information packets is greater than a portion of a system quality of service (QoS) parameter allocated to an information-processing unit.

29. The method of claim 27, wherein the total elapsed time between the at least two separate user information packets is less than the portion of the system quality of service (QoS) parameter allocated to an information-processing unit.

30. The method of claim 27, wherein the total elapsed time between the at least two separate user information packets is equal to the portion of the system quality of service (QoS) parameter allocated to an information-processing unit.

31. The method of claim 27, wherein information contained in the user information packets are at least one of packet voice and packet data.

32. The method of claim 27, wherein the quality of service (QoS) parameter for the information transmission system is maintained.

33. The method of claim 27, wherein an end-to-end quality of service (QoS) requirement is maintained.

34. The method of claim 27, wherein a portion of a system quality of service parameter (QoS) allocated to the information-processing unit is dynamically changed.

35. An apparatus comprising:
an information transmission system to receive and convey a single transmission packet of user information comprising at least two separate user information packets, wherein at least one power up cycle and one power down cycle is eliminated by conveying the single transmission packet.

36. The apparatus of claim 35, wherein a total elapsed time between the at least two separate user information packets is greater than a portion of a system quality of service (QoS) parameter allocated to an information-processing unit.

37. The apparatus of claim 35, wherein the total elapsed time between the at least two separate user information packets is less than the portion of the system quality of service (QoS) parameter allocated to the information-processing unit.

38. The apparatus of claim 35, wherein the total elapsed time between the at least two separate user information packets is equal to the portion of the system quality of service (QoS) parameter allocated to the information-processing unit.

39. The apparatus of claim 35, wherein information contained in the user information packets are at least one of packet voice and packet data.

40. The apparatus of claim 35, wherein an end-to-end quality of service (QoS) requirement is maintained.

41. A computer readable medium containing executable program instructions, which when executed by a data processing system, cause the data processing system to perform a method comprising:
inputting a single transmission packet of user information comprising a combination of at least two separate user information packets into an information transmission system;
conveying the transmission packet through the information transmission system; and
eliminating at least one power up cycle and one power down cycle by conveying the transmission packet.

42. The computer readable medium of claim 41, wherein a total elapsed time between the at least two separate user information packets is greater than a portion of a system quality of service (QoS) parameter allocated to an information-processing unit.

43. The computer readable medium of claim 41, wherein a total elapsed time between the at least two separate user information packets is less than a portion of a system quality of service (QoS) parameter allocated to an information-processing unit.

44. The computer readable medium of claim 41, wherein a total elapsed time between the at least two separate user information packets is equal to a portion of a system quality of service (QoS) parameter allocated to an information-processing unit.

45. A method comprising:
receiving, from an information transmission system, a single transmission packet of user information, comprising a combination of at least two separate user information packets, into an information-processing unit;
processing at least one of the transmission packet and the at least two separate user information packets; and
eliminating at least one power up cycle and one power down cycle by processing the at least one transmission packet.

46. The method of claim 45, wherein a total elapsed time between the at least two separate user information packets is greater than a portion of a system quality of service parameter (QoS) allocated to an information-processing unit that formed the transmission packet.

47. The method of claim 45, wherein a total elapsed time between the at least two separate user information packets is less than a portion of a system quality of service parameter (QoS) allocated to an information-processing unit that formed the transmission packet.

48. The method of claim 45, wherein a total elapsed time between the at least two separate user information packets is equal to a portion of a system quality of service parameter (QoS) allocated to an information-processing unit that formed the transmission packet.

49. The method of claim 45, wherein information contained in the user information packets are at least one of packet voice and packet data.

50. The method of claim 45, wherein an end-to-end QoS requirement is maintained.

51. A computer readable medium containing executable program instructions, which when executed by a data processing system, cause the data processing system to perform a method comprising:
receiving, from an information transmission system, a single transmission packet of user information, comprising a combination of at least two separate user information packets, into an information-processing unit;

processing at least one of the transmission packet and the at least two separate user information packets; and eliminating at least one power up cycle and one power down cycle by processing the at least one transmission packet.

52. The computer readable medium of claim 51, wherein a total elapsed time between the at least two separate user information packets is greater than a portion of a system quality of service parameter allocated to an information-processing unit that formed the transmission packet.

53. The computer readable medium of claim 51, wherein a total elapsed time between the at least two separate user information packets is less than a portion of a system quality of service parameter allocated to an information-processing unit that formed the transmission packet.

54. The computer readable medium of claim 51, wherein a total elapsed time between the at least two separate user information packets is not equal to a portion of a system quality of service parameter allocated to an information-processing unit that formed the transmission packet.

55. The method of claim 45, wherein a portion of a system quality of service parameter (QoS) allocated to the information-processing unit is dynamically changed.

56. A computer readable medium containing executable program instructions, which when executed by a data processing system, cause the data processing system to perform the steps comprising:

combining at least two separate user information packets into a transmission packet by an information-processing unit; and eliminating at least one power up cycle and one power down cycle by transmitting the transmission packet.

57. The computer readable medium of claim 56, wherein a total elapsed time between the at least two separate user information packets is greater than a portion of a system quality of service (QoS) parameter allocated to the information-processing unit.

58. The computer readable medium of claim 56, wherein a total elapsed time between the at least two separate user information packets is less than a portion of a system quality of service (QoS) parameter allocated to the information-processing unit.

59. The computer readable medium of claim 56, wherein a total elapsed time between the at least two separate user information packets is equal to a portion of a system quality of service (QoS) parameter allocated to the information-processing unit.

* * * * *